(12) United States Patent
Yang (10) Patent No.: US 9,617,891 B2
(45) Date of Patent: Apr. 11, 2017

(54) UREA BACKFLOW PREVENTION APPARATUS OF SCR AND CONTROL METHOD THEREOF

(71) Applicant: Hyundai Motor Company, Seoul (KR)

(72) Inventor: Dae-Won Yang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/788,974

(22) Filed: Jul. 1, 2015

(65) Prior Publication Data
US 2016/0138450 A1    May 19, 2016

(30) Foreign Application Priority Data

Nov. 14, 2014    (KR) .................... 10-2014-0158660

(51) Int. Cl.
*F01N 3/00* (2006.01)
*F01N 3/10* (2006.01)
*F01N 3/20* (2006.01)

(52) U.S. Cl.
CPC ........ *F01N 3/2066* (2013.01); *F01N 2610/02* (2013.01); *F01N 2610/146* (2013.01); *F01N 2610/1493* (2013.01); *Y02T 10/24* (2013.01)

(58) Field of Classification Search
CPC .. F01N 2610/02; F01N 3/2066; F01N 3/0842; F01N 2260/14; F01N 3/208; Y02T 10/24
USPC .................................. 60/286, 295, 301, 303
See application file for complete search history.

(56) References Cited

U.S. PATENT DOCUMENTS

| 5,884,475 | A  | * | 3/1999 | Hofmann | ........... B01D 53/9431 60/274 |
| 7,100,366 | B2 | * | 9/2006 | Hager | ............... B01D 53/9431 137/853 |
| 8,397,491 | B2 | * | 3/2013 | Bauer | .................. F01N 3/2066 137/558 |
| 8,459,013 | B2 | * | 6/2013 | Hosaka | ................. F01N 3/2066 60/286 |

(Continued)

FOREIGN PATENT DOCUMENTS

| JP | 2009-002260 A | 1/2009 |
| JP | 2009-097348 A | 5/2009 |

(Continued)

*Primary Examiner* — Thai Ba Trieu
*Assistant Examiner* — Diem Tran
(74) *Attorney, Agent, or Firm* — Morgan, Lewis & Bockius LLP (57) ABSTRACT

A urea backflow prevention apparatus of SCR in an SCR system which injects a urea solution into an exhaust pipe may include: a urea tank to store the urea solution; a nozzle to be installed in the exhaust pipe to inject the urea solution; a supply pump to pump the urea solution; a suction line connecting the urea tank to the supply pump; a pressure line connecting the supply pump to the nozzle; a return line connecting the supply pump to the urea tank to return un-injected urea solution back to the urea tank; and a backflow prevention line connecting the pressure line to the return line. The backflow prevention line keeps pressures of the pressure line, the supply pump directly connected to the pressure line and the suction line indirectly connected to the pressure line equal to an atmospheric pressure after an operation of the SCR system ends.

8 Claims, 8 Drawing Sheets

(56) References Cited

U.S. PATENT DOCUMENTS

| | | | |
|---|---|---|---|
| 8,893,480 B2 * | 11/2014 | Chiba | ............ F01N 3/208 60/286 |
| 2004/0060286 A1 | 4/2004 | Huber | |
| 2011/0047972 A1 | 3/2011 | Bauer et al. | |
| 2011/0146241 A1 | 6/2011 | Hodgson et al. | |

FOREIGN PATENT DOCUMENTS

| | | |
|---|---|---|
| JP | 2010-037979 A | 2/2010 |
| JP | 2010-071270 A | 4/2010 |
| JP | 2012-127214 A | 7/2012 |
| JP | 2012-140920 A | 7/2012 |
| JP | 2012-163029 A | 8/2012 |
| JP | 2013-170569 A | 9/2013 |
| JP | 2014-95337 A | 5/2014 |
| KR | 10-2002-0033828 A | 5/2002 |
| KR | 10-0999571 B1 | 12/2010 |
| KR | 10-1084742 B1 | 11/2011 |
| WO | WO 2013/008493 A1 | 1/2013 |

* cited by examiner

UREA BACKFLOW PREVENTION APPARATUS OF SCR AND CONTROL METHOD THEREOF

CROSS-REFERENCE TO RELATED APPLICATIONS

The present application claims priority of Korean Patent Application Number 10-2014-0158660 filed on Nov. 14, 2014, the entire contents of which application are incorporated herein for all purposes by this reference.

BACKGROUND OF INVENTION

Field of Invention

The present invention relates to a urea backflow prevention apparatus of selective catalyst reduction (SCR) and a control method thereof, and more particularly, to a urea backflow prevention apparatus of SCR and a control method thereof capable of preventing a supply pump from being damaged due to freezing of a backflowing urea solution.

Description of Related Art

An internal combustion engine vehicle using fossil fuel such as gasoline and diesel vehicles has a serious problem of environmental pollution due to exhaust gas. In particular, in the case of a diesel vehicle such as a bus and a truck, emission of smoke, nitrogen oxide (NOx), and fine dust including smoke has been recognized as a serious problem. To solve a problem of exhaust gas of the diesel vehicle, each country prepares related regulations to strictly regulate emission of exhaust gas.

Generally, an exhaust system of a diesel engine includes exhaust gas post-treating apparatuses such as a diesel oxidation catalyst (DOC), a diesel particulate matter filter (DPF), a selective catalyst reduction (SCR), and a lean NOx trap (LNT) so as to reduce carbon monoxide (CO), hydrocarbon (HC), particulate matter, nitrogen oxide (NOx), and the like which are pollutants included in exhaust gas.

Among those, the exhaust gas post-treating apparatus using the SCR (hereinafter, referred to as 'SCR system') serves to inject a reducer such as urea into an exhaust pipe to reduce nitrogen oxide in exhaust gas into nitrogen and oxygen. That is, when the reducer is injected into the exhaust pipe, the SCR system may convert the reducer into ammonia $NH_3$ due to heat from exhaust gas and reduce nitrogen oxide into nitrogen gas $N_2$ and water $H_2O$ by a catalytic reaction between the nitrogen oxide and the ammonia in exhaust gas using an SCR catalyst.

Figure 1A:
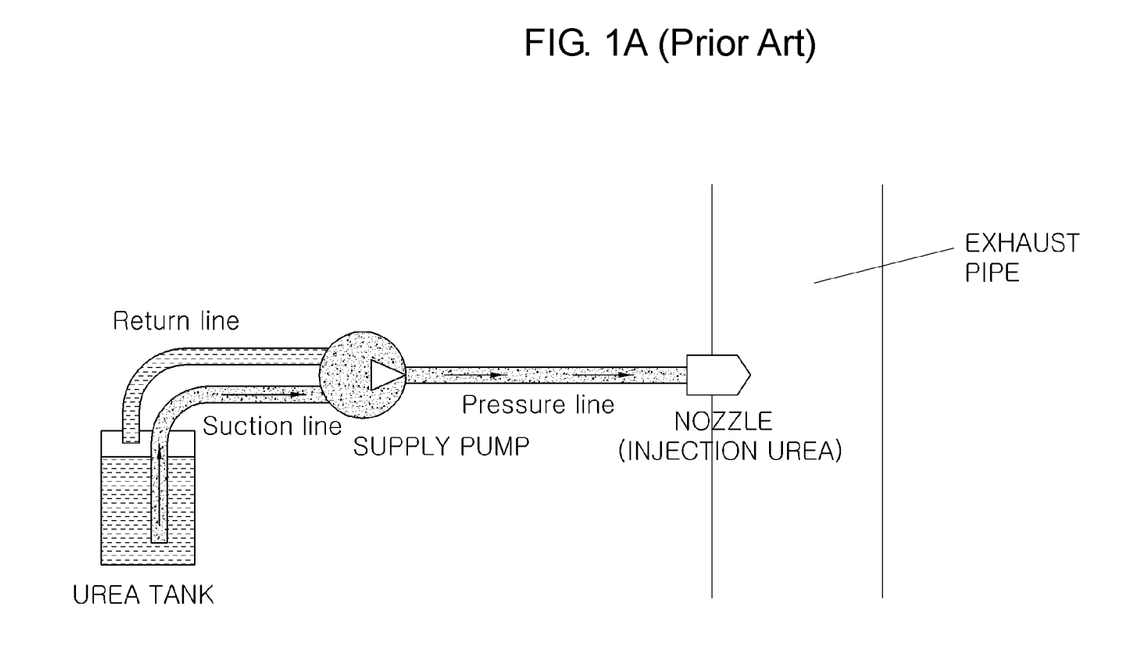
FIG. 1A and FIG. 1B are diagrams for describing an SCR system in accordance with the related art.
Figure 1B:
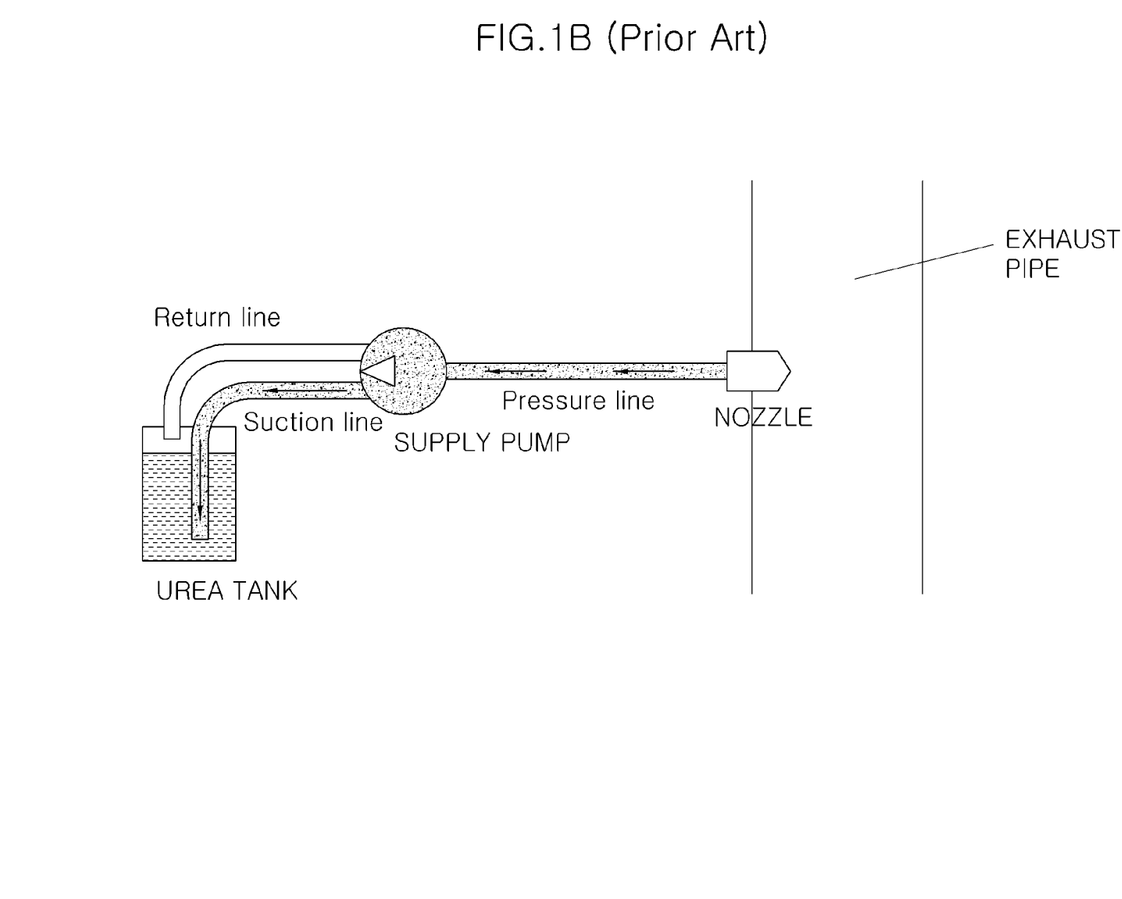
Figure 2A:
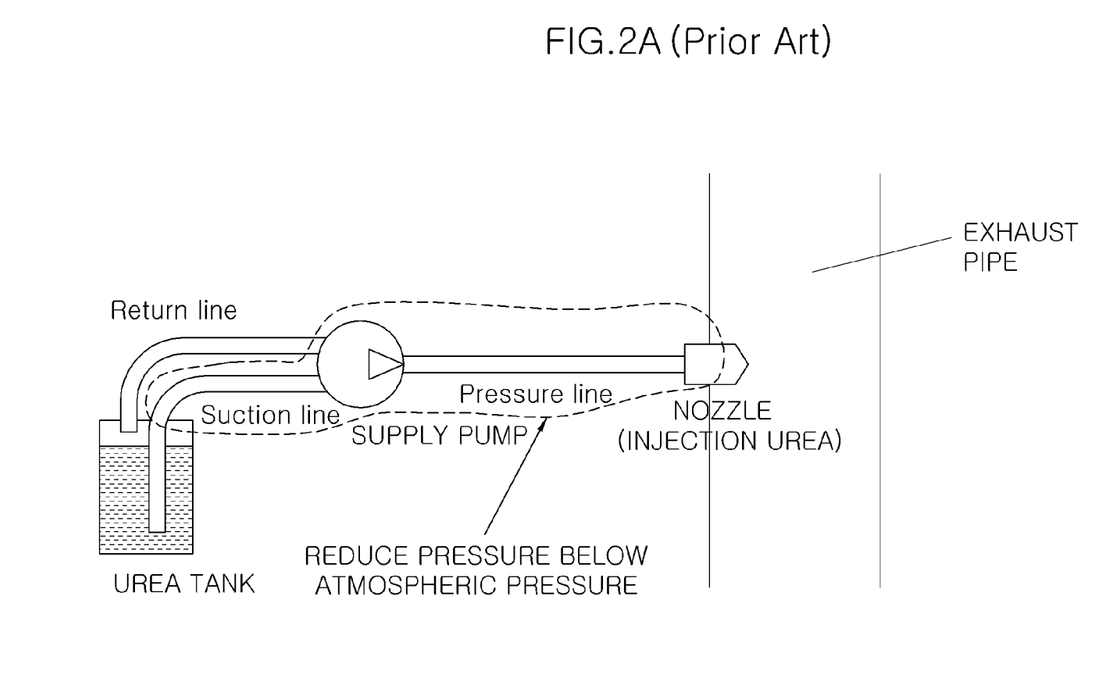
FIG. 2A and FIG. 2B are diagrams for describing a problem of the SCR system in accordance with the related art.
Figure 2B:
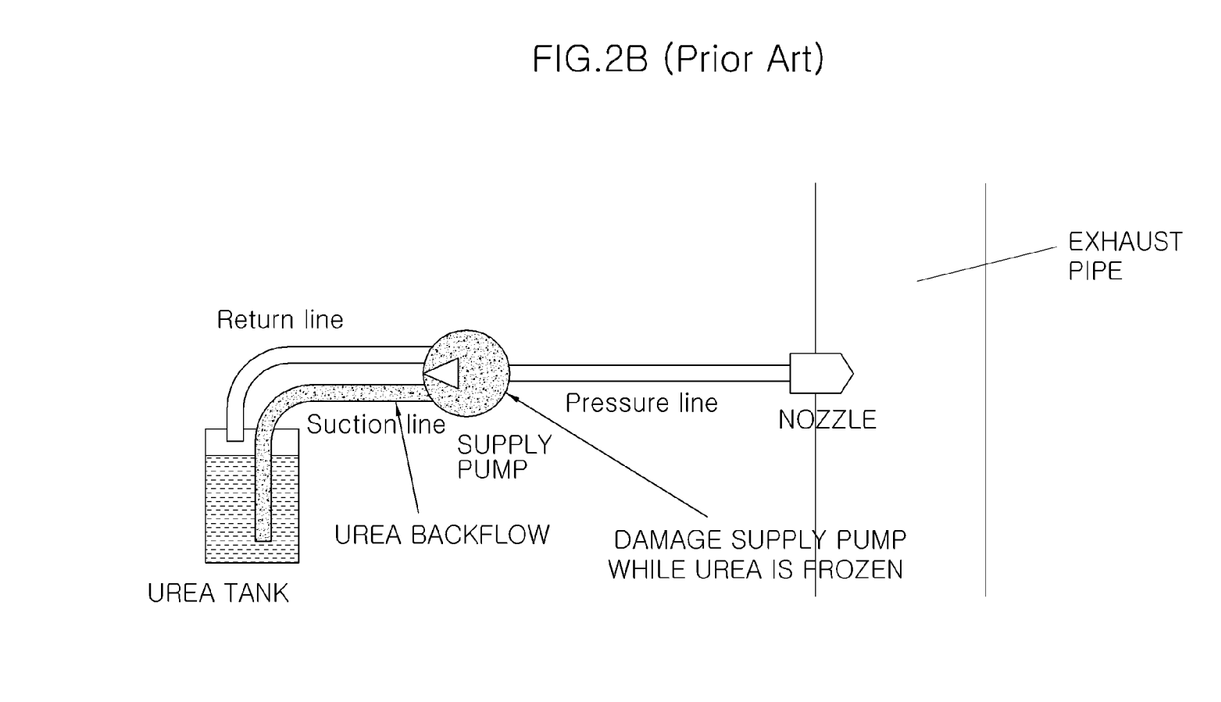

FIG. 1A and FIG. 1B are diagrams for describing an SCR system in accordance with the related art and FIG. 2A and FIG. 2B are diagrams for describing a problem of the SCR system in accordance with the related art. Referring to FIGS. 1A, 1B, 2A and 2B, when the SCR system is normally operated, the SCR system in accordance with the related art presses a urea solution stored in a urea tank by a pump so as to inject the urea solution into an exhaust pipe through a nozzle (see FIG. 1A). Further, when an engine stops, the urea solution is again recovered to the urea tank (see FIG. 1B). The purpose of recovering the urea solution is to prevent parts of the SCR system from being damaged due to an increase in volume of the urea which is caused by freezing of the urea when temperature becomes very cold during the winter.

However, after all the urea solution is recovered, when a vehicle stops or stays outdoor for a long period of time during the winter, an internal temperature of the SCR system in accordance with the related art balances outdoor temperature and then drops from a normal operation temperature (about 40° C.) below zero. In this case, a pressure of an internal channel of the closed SCR system which balances an atmospheric pressure is reduced at the time of recovering the urea solution (see FIG. 2A), such that the urea solution in the urea tank backflows to a supply pump through a suction line (see FIG. 2B). Therefore, when the backflowing urea solution is frozen, the supply pump may be damaged.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is directed to a urea backflow prevention apparatus of SCR and a control method thereof capable of preventing a urea solution in a urea tank of a stopping vehicle from backflowing to a supply pump through a suction line.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a urea backflow prevention apparatus of selective catalytic reduction (SCR) in an SCR system which injects a urea solution into an exhaust pipe may include: a urea tank configured to store the urea solution; a nozzle configured to be installed in the exhaust pipe to inject the urea solution into the exhaust pipe; a supply pump configured to pump the urea solution; a suction line configured to connect the urea tank to the supply pump to supply the urea solution stored in the urea tank to the supply pump; a pressure line configured to connect the supply pump to the nozzle to deliver the urea solution pumped by the supply pump to the nozzle; a return line configured to connect the supply pump to the urea tank to return un-injected urea solution back to the urea tank; and a backflow prevention line configured to connect the pressure line to the return line, wherein the backflow prevention line keeps pressures of the pressure line, the supply pump directly connected to the pressure line and the suction line indirectly connected to the pressure line equal to an atmospheric pressure after an operation of the SCR system ends.

The urea backflow prevention apparatus may further include: a shut-off valve disposed on the backflow prevention line to open or close the backflow prevention line.

The urea backflow prevention may further include: one or more urea sensors disposed at one or more of the suction line, the supply pump, and the pressure line to sense whether the urea solution is present at the one or more of the suction line, the supply pump, and the pressure line after the operation of the SCR system ends.

The urea backflow prevention apparatus may further include: a controller configured to receive a signal or signals from the one or more urea sensors, and control the shut-off valve to open or close the backflow prevention line in accord with whether the urea solution is present at the one or more of the suction line, the supply pump, and the pressure line after the operation of the SCR system ends.

The urea tank may include a vent hole opened to an atmosphere.

The return line may be shorter than the suction line and a lower portion of the return line may be positioned on or above a surface of the urea solution in the urea tank at all times.

In accordance with another aspect of the present invention, a control method of a urea backflow prevention apparatus of selective catalytic reduction (SCR) may include: determining whether an engine of a vehicle stops; if it is determined that the engine stops, recovering urea solution by operating a supply pump in a reverse direction to recover the urea solution in a pressure line, a supply pump, and a suction line to a urea tank; after the recovering of the urea solution, determining whether the recovery of the urea solution is completed based on a signal or signals received by a controller from one or more urea sensors disposed on one or more of the suction line, the supply pump, and the pressure line, wherein the signal or signals indicate whether the urea solution is present at the one or more of the suction line, the supply pump, and the pressure line; and opening a shut-off valve by allowing the controller to transmit an opening signal to the shut-off valve if it is determined that the recovery of the urea solution is completed.

The control method may further include: after the opening of the shut-off valve, determining, by the controller, whether the engine starts.

The control method may further include: closing the shut-off valve by allowing the controller to transmit a closing signal to the shut-off valve if it is determined that the engine starts.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode. Therefore, the configurations described in the exemplary embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application. In the present specification, an overlapped description and a detailed description for well-known functions and configurations that may obscure the gist of the present invention will be omitted. Hereinafter, exemplary embodiments of the present invention will be described in detail with reference to the accompanying drawings.

Figure 3:
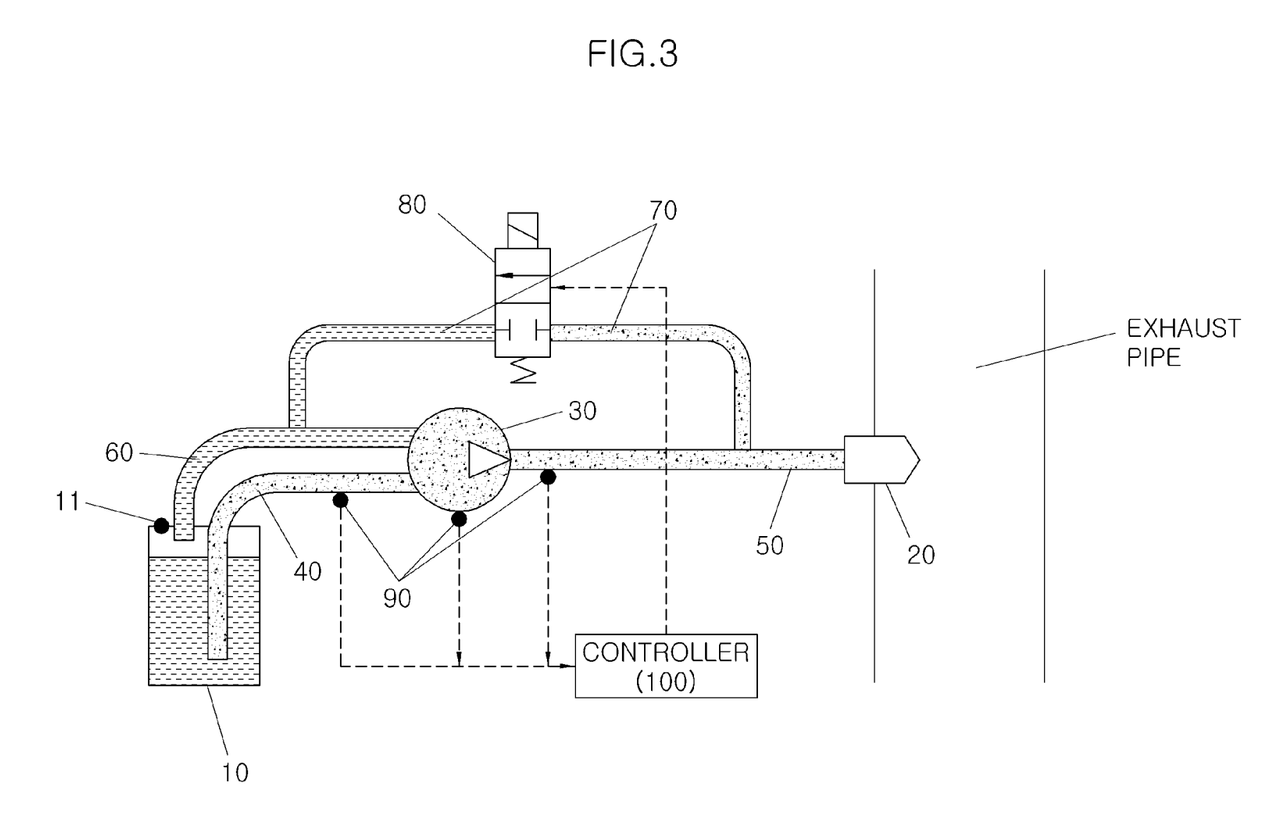
FIG. 3 is a diagram for describing an exemplary urea backflow prevention apparatus of SCR in accordance with the present invention.

FIG. 3 is a diagram for describing a urea backflow prevention apparatus of SCR in accordance with some embodiments of the present invention. Referring to FIG. 3, the urea backflow prevention apparatus of SCR in accordance with some embodiments of the present invention includes a urea tank 10, a nozzle 20, a supply pump 30, a suction line 40, a pressure line 50, a return line 60, a backflow prevention line 70, a shut-off valve 80, a urea sensor 90, and a controller 100.

The urea tank 10 stores a urea solution. The urea tank 10 includes a vent hole 11 which is opened into the atmosphere. The vent hole 11 serves to discharge internal air or gas of the urea tank 10. Further, as described below, after an operation of an SCR system ends and a recovery of the urea solution ends, an internal pressure of the SCR system may keep a balance with an atmospheric pressure due to the vent hole 11.

The nozzle 20 is installed in an exhaust pipe to serve to inject the urea solution into the exhaust pipe.

The supply pump 30 serves to press the urea solution so as to inject the urea solution from the nozzle 20 into the exhaust pipe. Further, as described above, the supply pump 30 serves to operate in a reverse direction to recover the urea solution after the operation of the SCR system ends to recover the urea solution of the SCR system to the urea tank 10.

The suction line 40 connects the urea tank 10 to the supply pump 30. Therefore, the suction line 40 serves to supply the urea solution stored in the urea tank 10 to the supply pump 30. To this end, a lower portion of the suction line 40 may be positioned under a surface of the urea solution which is stored in the urea tank 10.

The pressure line 50 connects the supply pump 30 to the nozzle 20. Therefore, the pressure line 50 serves to deliver the urea solution pressed by the supply pump 30 to the nozzle 20.

The return line 60 connects the supply pump 30 to the urea tank 10. Therefore, the return line 60 serves to recover the urea solution which is not injected from the nozzle 20 to the urea tank 10. The return line 60 is formed to be shorter than the suction line 40 and thus the lower portion of the return line 60 may be positioned on or above a surface of the urea solution in the urea tank 10.

The backflow prevention line 70 connects the pressure line 50 to the return line 60. Therefore, after the operation of a selective catalytic reduction (SCR) system ends, the backflow prevention line 70 may keep a pressure or pressures of the pressure line 50, the supply pump 30 directly connected to the pressure line 50, and the suction line 40 indirectly connected to the pressure line 50 to be equal or substantially equal to an atmospheric pressure.

The shut-off valve 80 is disposed on the backflow prevention line 70. Therefore, the shut-off valve 80 serves to open and close the backflow prevention line 70.

The urea sensor (or sensors) 90 is disposed at one or more of the suction line 40, the supply pump 30, and the pressure line 50. Therefore, the urea sensor 90 senses whether the urea solution is present at one or more of the suction line 40, the supply pump 30, and the pressure line 50 after the operation of the selective catalytic reduction (SCR) system ends. The urea sensor 90 serves to sense whether all the urea solution is recovered to the urea tank 10 after the operation of the selective catalytic reduction (SCR) system ends.

The controller 100 receives a signal on whether the urea solution is present at one or more of the suction line 40, the supply pump 30, and the pressure line 50 after the operation of the selective catalytic reduction (SCR) system ends. Further, the controller 100 transmits a signal to allow the shut-off valve 80 to open and close the backflow prevention line 70.

Figure 4A:
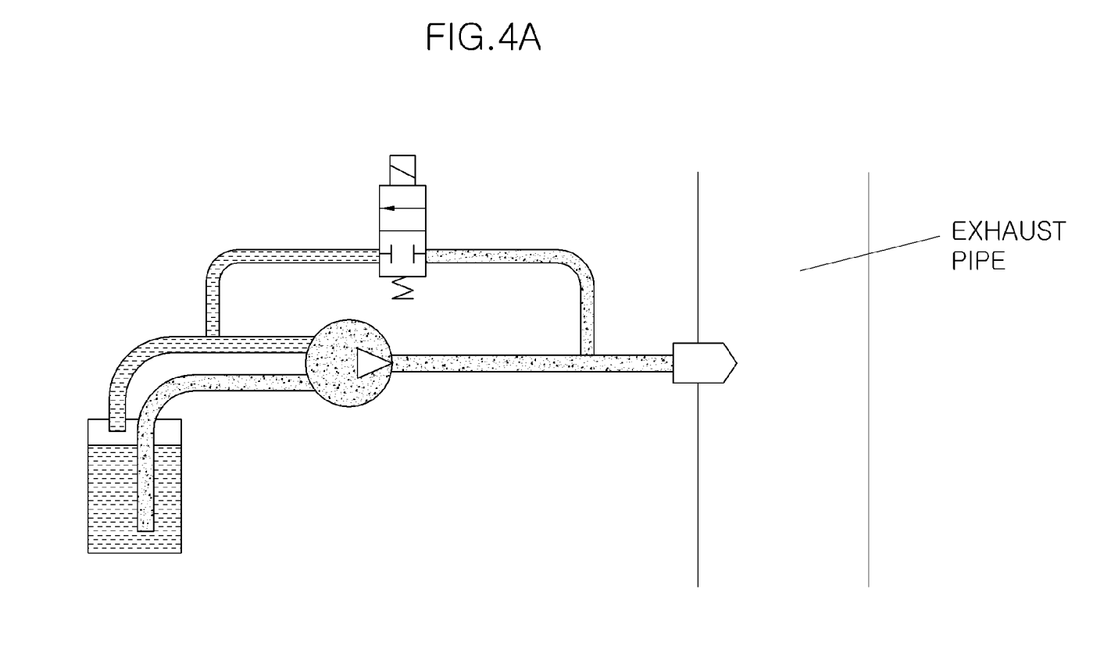
FIG. 4A and FIG. 4B are diagrams for describing an exemplary operation of the urea backflow prevention apparatus of SCR in accordance with the present invention.
Figure 4B:
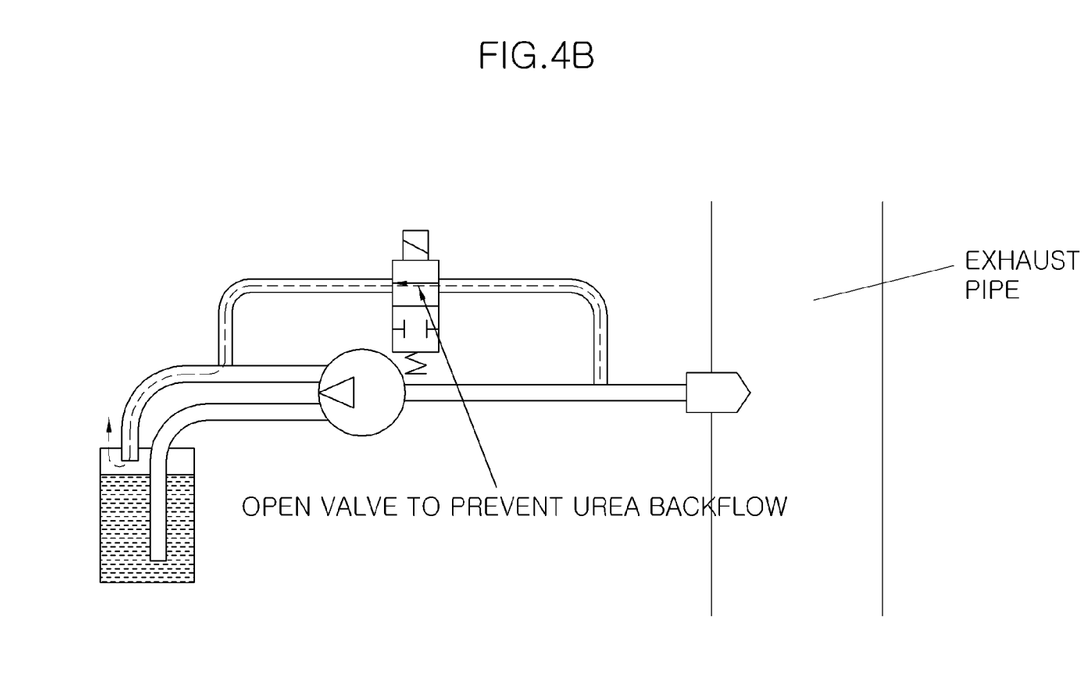

FIG. 4A and FIG. 4B are diagrams for describing the operation of the urea backflow prevention apparatus of SCR in accordance with some embodiments of the present invention. Referring to FIG. 4A, when the SCR system is normally operated, the shut-off valve 80 is closed and the supply pump 30 is operated in a forward direction. Therefore, the urea solution stored in the urea tank 10 moves the supply pump 30 along the suction line 40 and the urea solution pressed by the supply pump 30 is supplied to the nozzle 20 along the pressure line 50 and thus injected into the exhaust pipe. In this case, the urea solution which is not injected into the exhaust pipe is again recovered to the urea tank 10 along the return line 60.

Further, when the urea solution is recovered, the shut-off valve 80 is closed and the supply pump 30 is operated in a reverse direction. Therefore, the urea solution which remains in the pressure line 50, the supply pump 30, or the suction line 40 is again recovered to the urea tank 10.

Referring to FIG. 4B, after the operation of the SCR system ends and the recovery of the urea solution is completed, the shut-off valve 80 is opened. Therefore, an internal channel of the SCR system, that is, the pressure line 50, the supply pump 30, or the suction line 40 communicates with atmosphere through the backflow prevention line 70, the return line 60, and the vent hole 11 of the urea tank 10. Therefore, a pressure of the internal channel of the SCR system balances the atmospheric pressure, and therefore even though the temperature of the SCR system drops, unlike the related art, the urea solution does not backflow.

Figure 5:
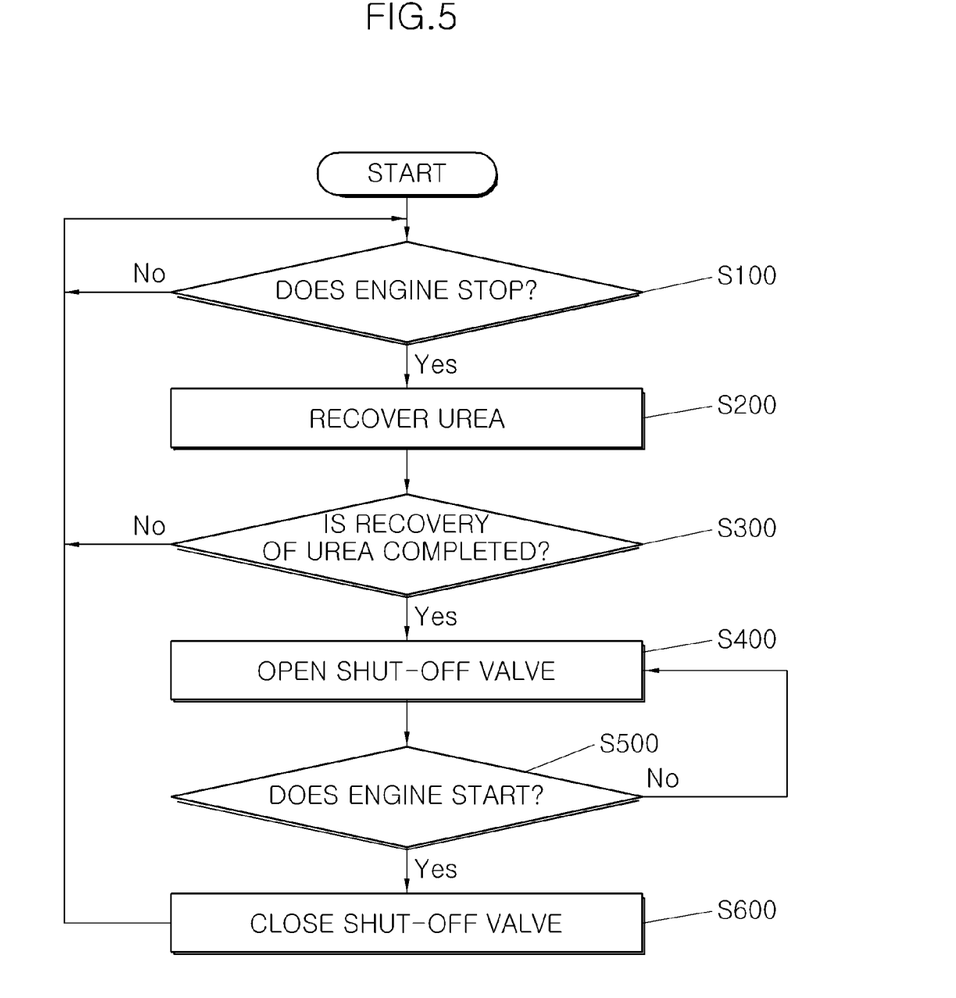
FIG. 5 is a flow chart of an exemplary control method of a urea backflow prevention apparatus of SCR in accordance with the present invention.

FIG. 5 is a flow chart of a control method of a urea backflow prevention apparatus of SCR in accordance with some embodiments of the present invention. Referring to FIG. 5, the control method of a urea backflow prevention apparatus of SCR in accordance with some embodiments of the present invention includes: determining whether the engine stops (S100), recovering the urea or urea solution (S200), determining whether the recovery of the urea or urea solution is completed (S300), opening the shut-off valve (S400), determining whether the engine starts (S500), and closing the shut-off valve (S600).

The determining whether the engine stops (S100) is a step of determining whether the engine of the vehicle stops. Only when the engine stops and then exhaust gas is not emitted, the determining whether the engine stops (S100) is to recover the urea solution.

If it is determined in the determining whether the engine stops (S100) that the engine stops, the recovering of the urea (S200) is a step of operating the supply pump 30 in a reverse direction to recover the urea solution in the pressure line 50, the supply pump 30, and the suction line 40 to the urea tank 10. The purpose of recovering the urea solution is to prevent parts of the SCR system from being damaged due to an increase in volume of the urea which is caused by freezing of the urea when temperature becomes very cold during the winter.

After the recovering of the urea (S200), the determining whether the recovery of the urea is completed (S300) is a step of determining whether the recovery of the urea solution is completed by allowing the controller 100 to receive the signal on whether the urea solution is present at one or more of the suction line 40, the supply pump 30, and the pressure line 50 from the urea sensor 90.

After the determining whether the recovery of the urea is completed (S300), the opening of the shut-off valve (S400) is a step of opening the shut-off valve 80 by allowing the controller 100 to transmit a signal to the shut-off valve 80 if the controller 100 determines that the recovery of the urea solution is completed. Therefore, the internal channel of the SCR system, that is, the pressure line 50, the supply pump 30, or the suction line 40 communicates with atmosphere through the backflow prevention line 70, the return line 60, and the vent hole 11 of the urea tank 10. Therefore, the pressure of the internal channel of the SCR system balances the atmospheric pressure, and therefore even though the temperature of the SCR system drops, unlike the related art, the urea solution does not backflow.

After the opening of the shut-off valve (S400), the determining whether the engine starts (S500) is a step of allowing the controller 100 to determine whether the controller 100 is again operated. Further, the closing of the shut-off valve (S600) is a step of closing the shut-off valve 80 by allowing the controller 100 to transmit the signal to the shut-off valve 80 if in the determining whether the engine starts (S500), the controller 100 determines that the engine again starts. When the engine restarts, the urea solution needs to be injected into the exhaust pipe to again purify NOx in the exhaust gas and therefore there is a need to determine whether the engine restarts. Further, to inject the urea solution into the exhaust pipe by restarting the engine, the shut-off valve 80 is again closed to prevent the urea solution pressed by the supply pump 30 from being leaked through the backflow prevention line 70.

As described above, in accordance with the exemplary embodiments of the present invention, it is possible to prevent a urea solution in a urea tank of a stopping vehicle from backflowing to a supply pump through a suction line, and to prevent the supply pump from being damaged when the backflowing urea solution is frozen.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea backflow prevention apparatus of selective catalytic reduction (SCR) in an SCR system which injects a urea solution into an exhaust pipe, the urea backflow prevention apparatus comprising:
   a urea tank configured to store the urea solution;
   a nozzle configured to be installed in the exhaust pipe to inject the urea solution into the exhaust pipe;
   a supply pump configured to pump the urea solution;
   a suction line configured to connect the urea tank to the supply pump to supply the urea solution stored in the urea tank to the supply pump;
   a pressure line configured to connect the supply pump to the nozzle to deliver the urea solution pumped by the supply pump to the nozzle;
   a return line configured to connect the supply pump to the urea tank to return un-injected urea solution back to the urea tank;
   a backflow prevention line configured to connect the pressure line to the return line, wherein the backflow prevention line keeps pressures of the pressure line, the supply pump directly connected to the pressure line and the suction line indirectly connected to the pressure line equal to an atmospheric pressure after an operation of the SCR system ends; and
   a shut-off valve disposed on the backflow prevention line to open or close the backflow prevention line,
   wherein the shut-off valve opens the backflow prevention line after the operation of the SCR system is terminated and a urea collection is completed by operating the supply pump in a reverse direction.

2. The urea backflow prevention apparatus of claim 1, further comprising:
   one or more urea sensors disposed at one or more of the suction line, the supply pump, and the pressure line to sense whether the urea solution is present at the one or more of the suction line, the supply pump, and the pressure line after the operation of the SCR system ends.

3. The urea backflow prevention apparatus of claim 2, further comprising:
   a controller configured to receive a signal or signals from the one or more urea sensors, and control the shut-off valve to open or close the backflow prevention line in accord with whether the urea solution is present at the one or more of the suction line, the supply pump, and the pressure line after the operation of the SCR system ends.

4. The urea backflow prevention apparatus of claim 1, wherein the urea tank includes a vent hole opened to an atmosphere.

5. The urea backflow prevention apparatus of claim 4, wherein the return line is shorter than the suction line and a lower portion of the return line is positioned on or above a surface of the urea solution in the urea tank at all times.

6. A control method of the urea backflow prevention apparatus of claim 1, the control method comprising:
   determining whether an engine of a vehicle stops;
   if it is determined that the engine stops, recovering the urea solution by operating the supply pump in the reverse direction to recover the urea solution in the pressure line, the supply pump, and the suction line to the urea tank;
   after the recovering of the urea solution, determining whether the recovery of the urea solution is completed based on a signal or signals received by a controller from one or more urea sensors disposed on one or more of the suction line, the supply pump, and the pressure line, wherein the signal or signals indicate whether the urea solution is present at the one or more of the suction line, the supply pump, and the pressure line; and
   opening the shut-off valve by allowing the controller to transmit an opening signal to the shut-off valve if it is determined that the recovery of the urea solution is completed,
   wherein after the opening a shut-off valve, pressures of the pressure line, the supply pump directly connected to the pressure line and the suction line indirectly connected to the pressure line are kept equal to an atmospheric pressure.

7. The control method of claim 6, further comprising:
   after the opening of the shut-off valve, determining, by the controller, whether the engine starts.

8. The control method of claim 7, further comprising:
   closing the shut-off valve by allowing the controller to transmit a closing signal to the shut-off valve if it is determined that the engine starts.

* * * * *